May 29, 1923.
W. C. SCOTT
1,457,231
CHECK NOTCHING DEVICE
Filed Feb. 21, 1922
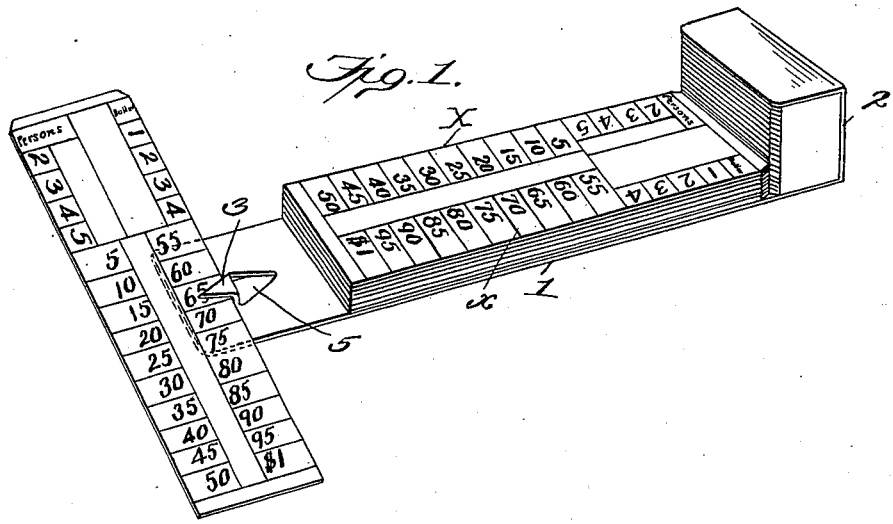
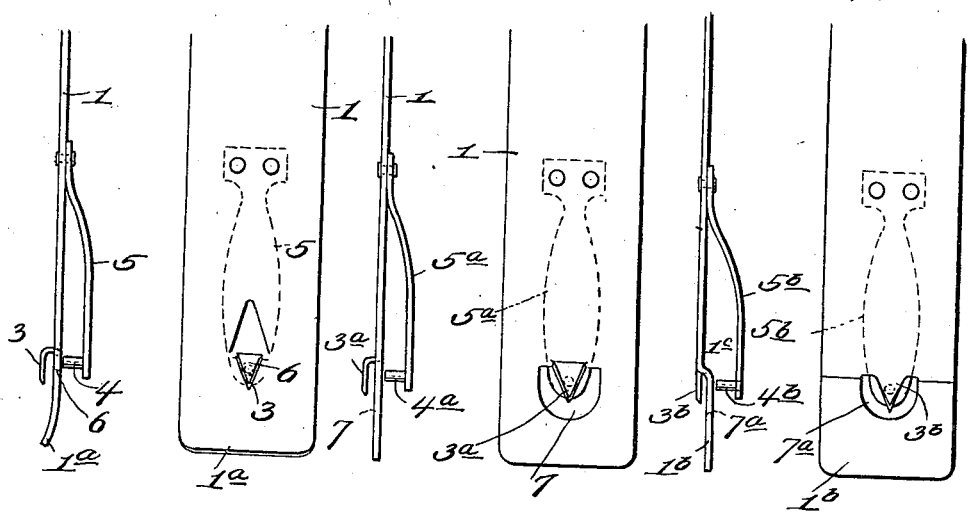
Inventor
Walter C. Scott
By James L. Norris
Attorney Patented May 29, 1923.

1,457,231

UNITED STATES PATENT OFFICE.

WALTER C. SCOTT, OF PHILADELPHIA, PENNSYLVANIA, ASSIGNOR TO GLOBE TICKET COMPANY, OF PHILADELPHIA, PENNSYLVANIA, A CORPORATION OF PENNSYLVANIA.

CHECK-NOTCHING DEVICE.

Application filed February 21, 1922. Serial No. 538,354.

*To all whom it may concern:*

Be it known that I, WALTER C. SCOTT, a citizen of the United States, residing at Philadelphia, in the county of Philadelphia and State of Pennsylvania, have invented new and useful Improvements in Check-Notching Devices, of which the following is a specification.

The present invention relates to improvements in check notching devices, and it is more particularly applicable to those of the general type embodying a holder adapted to hold a pad or pack of restaurant or similar checks and a device for notching and thereby marking a check detached from the pack to indicate the amount of a purchase or the amount to be paid by the purchaser to the cashier.

The invention is especially applicable to check notching devices of the same general class as that shown and described in Letters Patent No. 1,229,176, granted June 5, 1917, wherein the notching device comprises substantially a tongue which is fixed relatively to a base plate or support and forms a space between it and the base plate to receive an edge of a check, the latter being notched and thereby marked by pulling the check laterally away from the base plate and past or over the notching tongue.

The primary object of the invention is to provide means for gripping or otherwise holding the edge of the check in proper position against the notching tongue during the notching operation, thereby facilitating the notching operation and also insuring notching of the check at the selected point in its edge, by preventing shifting of the check during or incident to the notching operation.

To these and other ends, the invention consists in certain improvements and combinations and arrangements of parts, all as will be hereinafter more fully described, the features of novelty being pointed out particularly in the claims at the end of the specification.

In the accompanying drawing:—

Figure 1 is a perspective view of a combined check holder and check notching device, the same being constructed in accordance with the present invention, the manner of inserting a check to be notched being illustrated;

Figure 2 represents an edge view of the notching device looking toward the lower edge in Figure 1;

Figure 3 is a rear view of the notching device as shown in Figures 1 and 2;

Figures 4 and 5 are edge and front views respectively of a slightly modified form of notching device constructed in accordance with the present invention; and Figures 6 and 7 are edge and front views respectively of another modified form of notching device also constructed in accordance with the present invention.

The present invention is applicable generally to ticket or check notching devices of the class adapted for use in connection with tickets or checks having numerals or amount indicating means along one or more of the marginal edges and which embody a tongue to overlie such marginal edge of the check and operative to notch the same adjacent to the numeral or amount indicating means representing the amount of a purchase or the amount the purchaser is to pay the cashier, the patent above referred to being an example of a check notching device to which the present invention is applicable.

Preferably and as shown in the present instance, the complete device comprises a base plate or support 1 adapted to receive at its forward side a pad or pack of tickets or checks designated X. One end of the base plate is provided with a suitable holder 2 to detachably engage the stub portion of the check pack, the holder shown as an example in the present instance being formed by doubling the line of the base plate over the stub end of the pack of checks and then extending the free end of the plate into substantial parallelism with the main portion of the base plate. It is to be understood, however, that any suitable kind of pack holder may be used. The checks are individually detachable from the stub portion of the pack and each check is printed or otherwise provided with rows of numerals or amount indicating characters *x*, these numerals being arranged along one or both of the longitudinal edges of the check.

The notching device is preferably formed on or carried by a part of the base plate which extends beyond the free end of the pad of checks. As shown in Figures 1 to 3 inclusive, the notching device comprises a pointed tongue 3 which overlies the forward side of the base plate and provides a space between it and the base plate to receive the edge of a detached check preparatory to notching, and in order to facilitate the insertion of the check, the lower edge of the base plate may be curved or bent forward as at $1^a$. Notching of the check is effected by pulling the lower edge of the check forwardly or away from the base plate, thus drawing the opposite edge of the check engaged by the notching tongue against and over the notching tongue, the sharp point and side edges of the tongue acting to notch the part of the check which the tongue engages. In order, however, to prevent shifting of the check during or incidental to the notching operation, and thereby insure notching of the check at precisely the point selected, means is provided according to the present invention for gripping or otherwise holding the check in non-shifting relation to the notching tongue after the check has been properly positioned with respect thereto. Preferably and as shown in Figures 1 to 3 inclusive, this check gripping or holding device comprises a pin or stud 4 which is carried on or near the free end of a resilient or movable arm 5 attached at a suitable point preferably at its upper end, to the rear side of the base plate. The pin or stud 4 is arranged to pass freely through an opening 6 formed in the base plate opposite to the under or rear side of the notching tongue 3. In the preferred construction, the normal tendency of the arm 5 is to retain the pin or stud 4 in retracted position relatively to the notching tongue 3, as is shown in Figure 2, thus permitting unobstructed insertion of the edge of the check to be notched; but when the check has been inserted and the notching tongue overlies the exact portion thereof which is to be notched, pressure forwardly on the arm 5 will cause the pin or stud 4 to engage the rear side of the check and to force the check against the rear side of the notching tongue, the edge of the check so engaged being thus gripped or clamped immovably against the notching tongue, and hence the check will be held from slipping or shifting relatively to the notching tongue during the notching operation. When the notching operation has been performed, the pin or stud will be retracted by the arm 5 and the notching device is then in condition to receive another check.

Figures 4 to 7 inclusive illustrate the invention as applied to notching devices which differ somewhat from that shown in Figures 1 and 3 inclusive. In the form of notching device shown in Figures 1 to 3 inclusive, the notching tongue 3 is formed by punching and doubling a tongue of metal from the base plate. In Figures 4 and 5, the notching tongue $3^a$ is formed by punching and offsetting a part of the metal from the base plate and providing a clearance space 7 around the notching tongue $3^a$ to facilitate dropping of the punching from beneath the notching tongue. The gripping or holding pin or stud $4^a$ and its carrying and operating arm $5^a$, however, are substantially the same as those shown in Figures 1 to 3 inclusive, it being unnecessary to provide a separate opening for the pin or stud as this pin or stud may work freely through the opening 7. In the embodiment of the invention shown in Figures 6 and 7, the lower end of the base plate is offset, as at $1^b$ and the notching tongue $3^b$ is formed by a portion of the metal which is cut from the base plate and is a continuation thereof in the plane of the main portion of the base plate, a space being thus formed between the notching tongue and the relatively offset portion $1^b$ of the base plate to receive the edge of the check to be notched. An opening $7^a$ larger than the notching tongue is formed in the relatively offset portion $1^b$ and adjacent to the notching tongue to provide a clearance to facilitate dropping of the punching cut from the check by the notching tongue, and the pin or stud $4^b$ may operate freely through this opening $7^a$ to grip and hold the edge of the check immovably against the rear side of the notching tongue. This pin or stud $4^b$ and its carrying arm $5^b$ may be substantially similar to these parts shown in Figures 1 to 5 inclusive. In the notching devices shown in Figures 1 to 5 inclusive, the part of the notching tongue which connects it to the base plate constitutes a limit stop to gage the depth to which the check is to be inserted, while in the notching device shown in Figures 6 and 7, the deflected portion $1^c$ which connects the offset portion $1^b$ with the main portion of the base plate provides a limit stop to gage the depth to which the check is to be inserted. In all instances, the pin or stud, when pressed into engagement with the check, grips and clamps the same immovably against the rear side of the notching tongue and the pin or stud is operated to perform this gripping and holding function by pressure of the finger against the rear side of the arm which carries the pin or stud, the arm being preferably widened, substantially as shown, to adapt it for this purpose.

By mounting the gripping and holding device at the rear side of the base plate and in position to be pressed forward by the fingers of the hand which grasp the device, the proper insertion and notching of each check is greatly facilitated, particularly as the check and notching tongue will be visible to the user while the check is being properly located relatively to the notching tongue, and the necessary forward pressure on the arm carrying the gripping pin or stud to bring the same into gripping or holding engagement with the check can be applied easily. By so constructing the gripping or holding device that the pin or stud will be automatically retracted from the notching tongue, the operation of inserting a check to be notched is greatly facilitated as the notching device is normally in condition to receive a check.

I claim as my invention:—

1. A check notching device comprising a support to hold a pack of checks, a notching tongue spaced from the support to receive an edge of a check to be notched, and means operable relatively to the notching tongue to hold such edge of the check immovable relatively to the notching tongue.

2. A check notching device comprising a support provided with means to hold a pack of checks, a notching tongue arranged in relatively fixed spaced relation to a side of said support to receive an edge of a check between it and said support, and means operable to engage a side of the check opposite to the side thereof which engages said tongue and to grip the check and thus hold it in a relatively fixed position against said tongue.

3. A check notching device comprising a suitable support, a notching tongue overlying the support and spaced therefrom to receive an edge of a check to be notched, and a gripping device operative relatively to the notching tongue to grip the portion of the check between it and the notching tongue.

4. A check-notching device comprising a suitable support, a notching tongue, rigidly spaced from the support for a distance sufficient to receive an edge of a check between it and the support, and a gripping device operative through the support to clamp such edge of the check between it and the notching tongue.

5. A notching device comprising a support having a notching tongue rigidly supported and spaced at one side of the support to receive an edge of a check between it and the support, and a gripping device operative through the support to engage and clamp such edge of the check between it and the notching tongue, and having an actuating part exposed for manipulation at a side of the support.

6. A notching device comprising a plate having a notching tongue spaced from one side of the plate to receive an edge of a check between it and said side of the plate, a gripping device operative through the plate to engage and clamp such edge of the check against the notching tongue, and an actuating member for said gripping device exposed for manipulation at the opposite side of the plate and tending to retract the gripping device relatively to the notching tongue.

7. A device of the character described comprising a base plate provided with means for holding a pack of checks at its forward side, a notching tongue overlying the front side of the base plate to receive an edge of a check between it and the base plate, a gripping device operative through the base plate from the rear side of the plate to engage and grip such edge of the check between it and the notching tongue, and an actuating member cooperative with the gripping device and exposed for operation at the rear side of the base plate.

In testimony whereof I have hereunto set my hand in presence of two subscribing witnesses.

WALTER C. SCOTT.

Witnesses:
PATRICK F. MURPHY,
PHILIP C. SNOW.